Feb. 8, 1972   P. H. FLECK   3,641,228
METHOD OF PRODUCING A MOLDED SIMULATED WOODEN ARTICLE
Filed Sept. 18, 1968   5 Sheets-Sheet 1
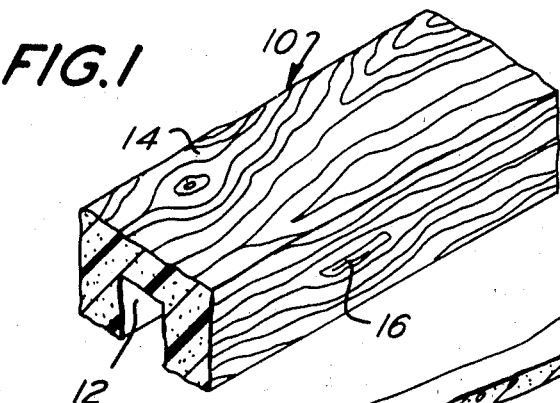
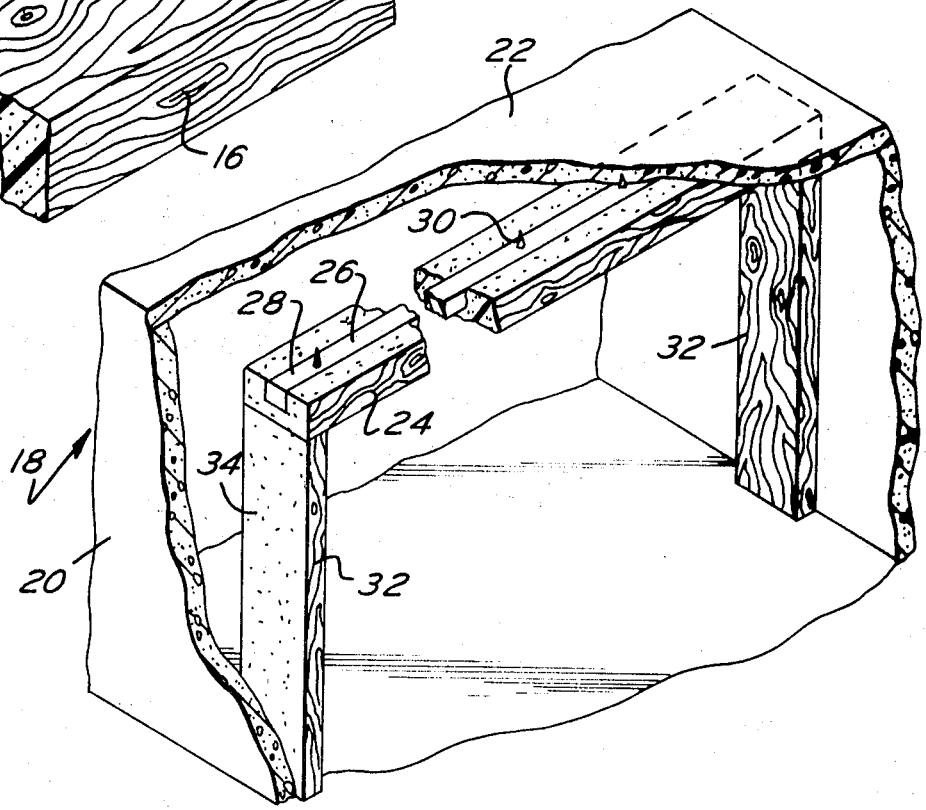
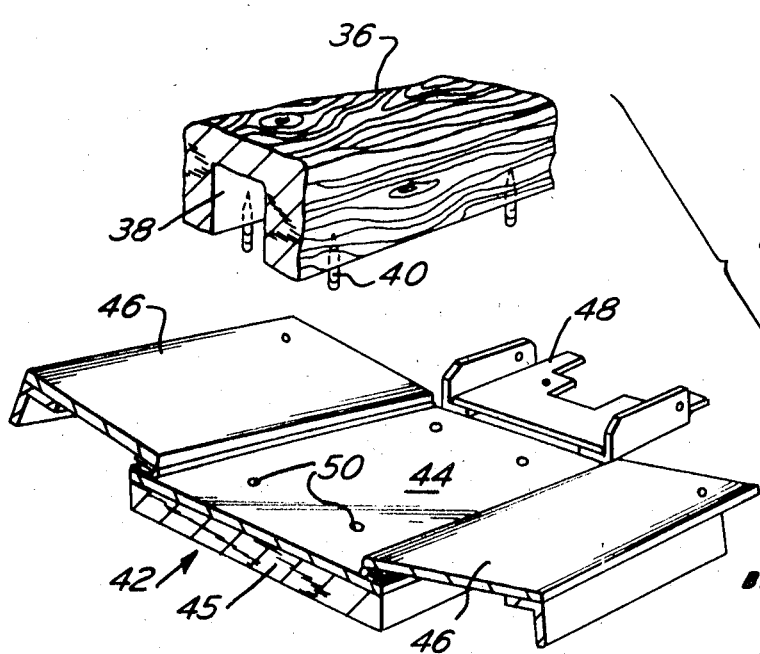
INVENTOR
PAUL H. FLECK
BY Jacob Trachtman
ATTORNEY

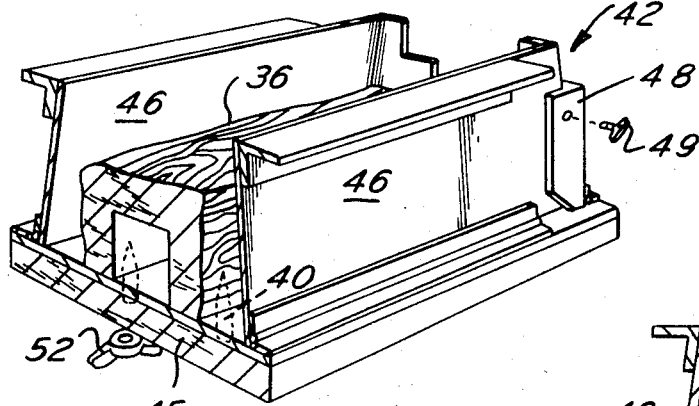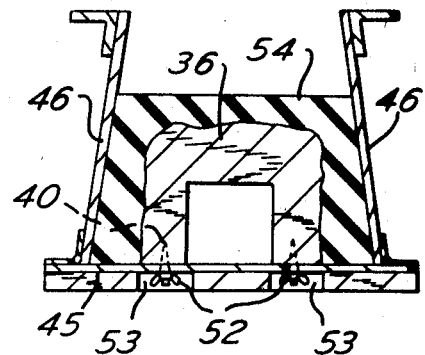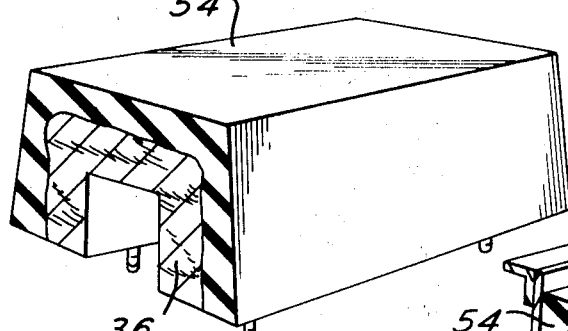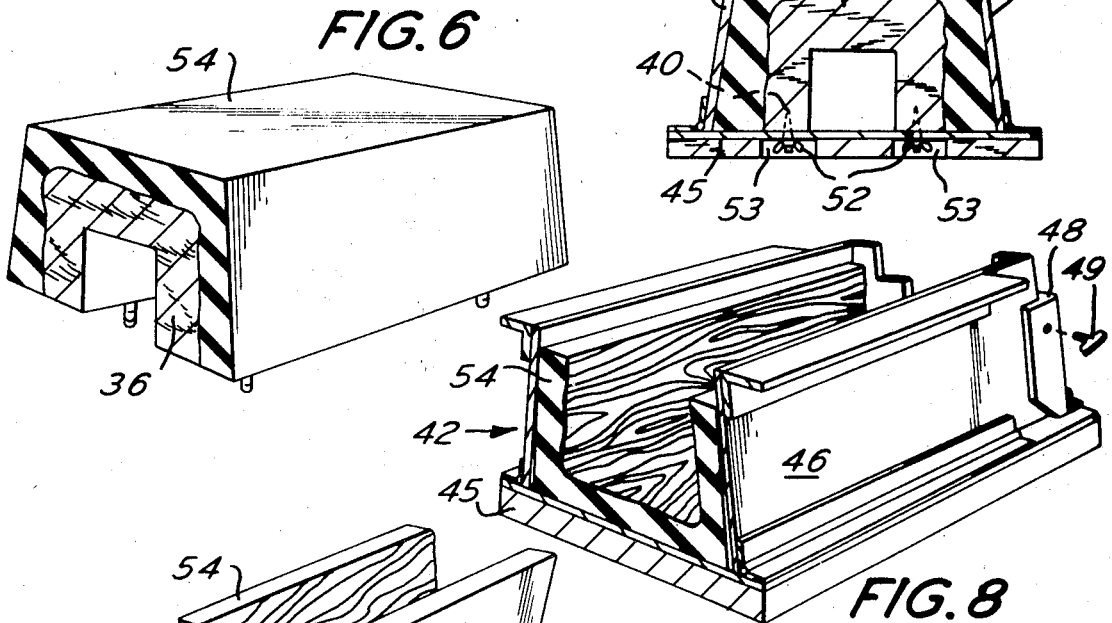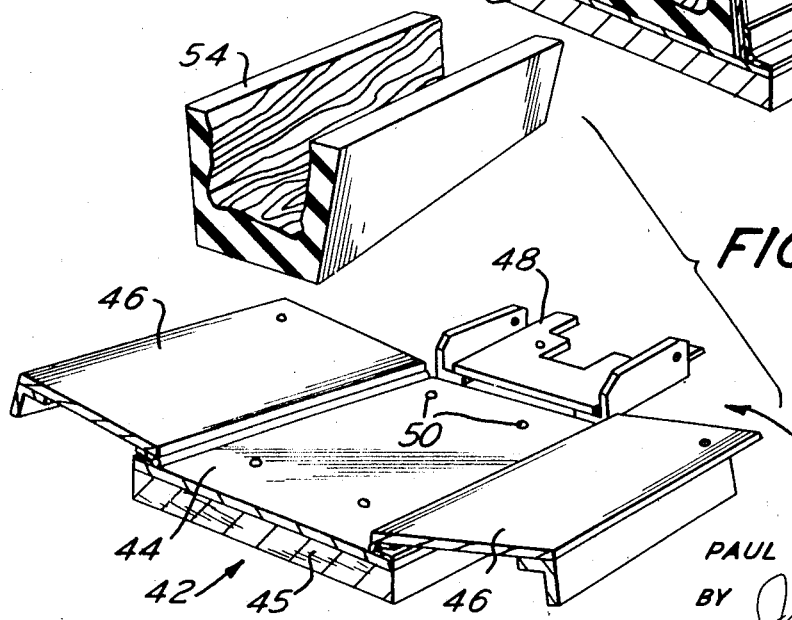

Feb. 8, 1972   P. H. FLECK   3,641,228
METHOD OF PRODUCING A MOLDED SIMULATED WOODEN ARTICLE
Filed Sept. 18, 1968   5 Sheets-Sheet 3
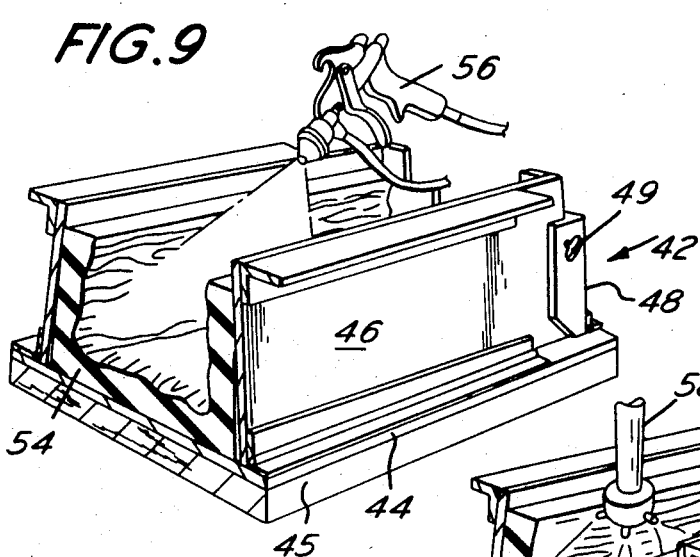
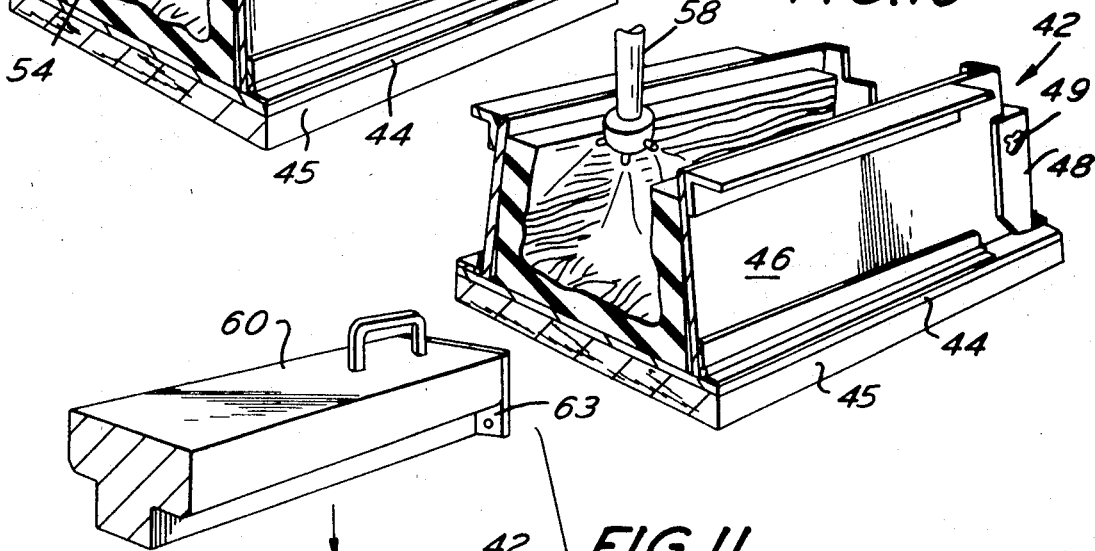
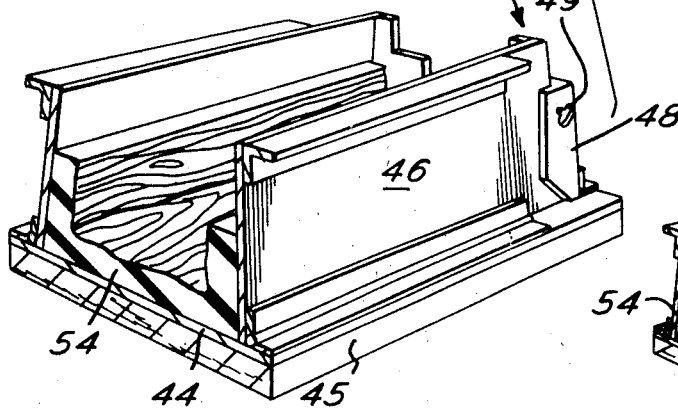
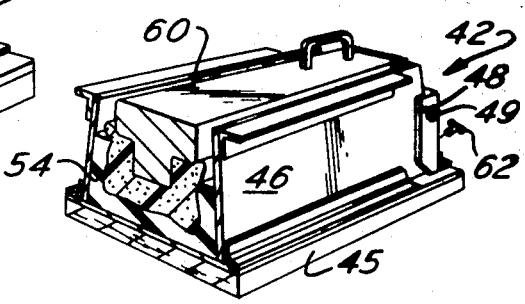
INVENTOR
PAUL H. FLECK
BY Jacob Nachtman
ATTORNEY

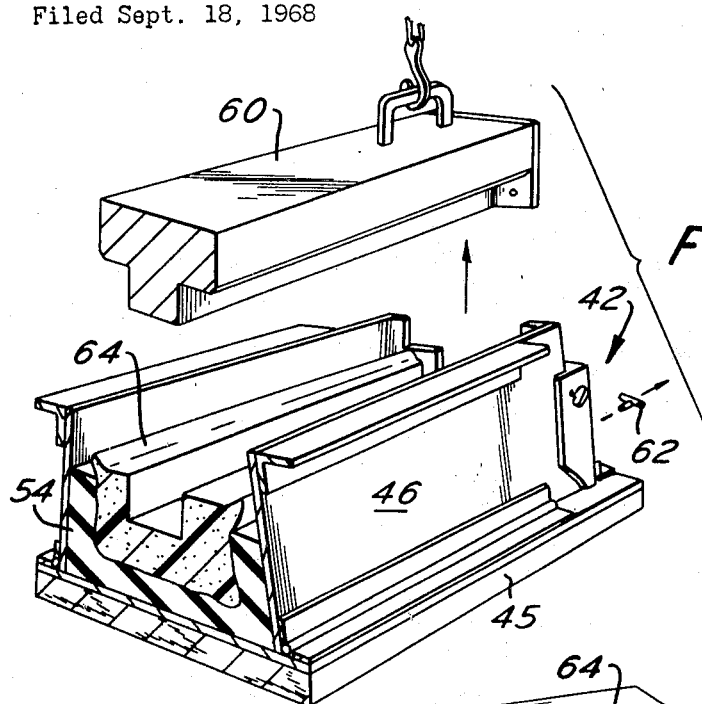
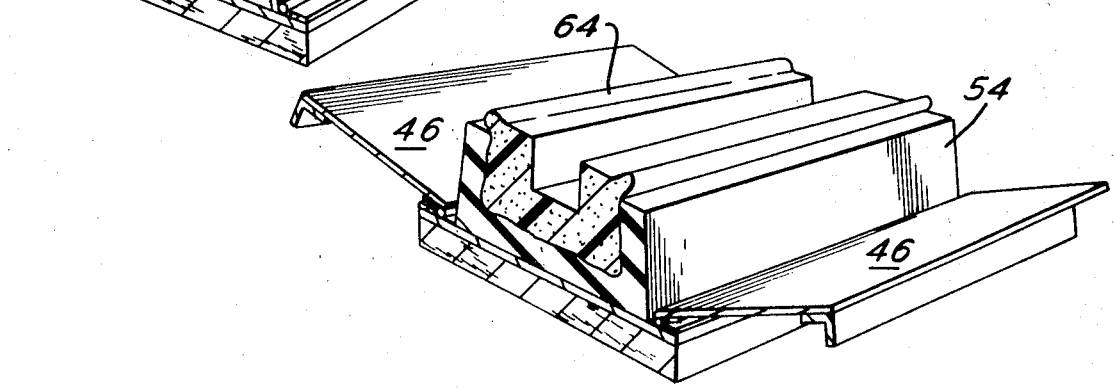
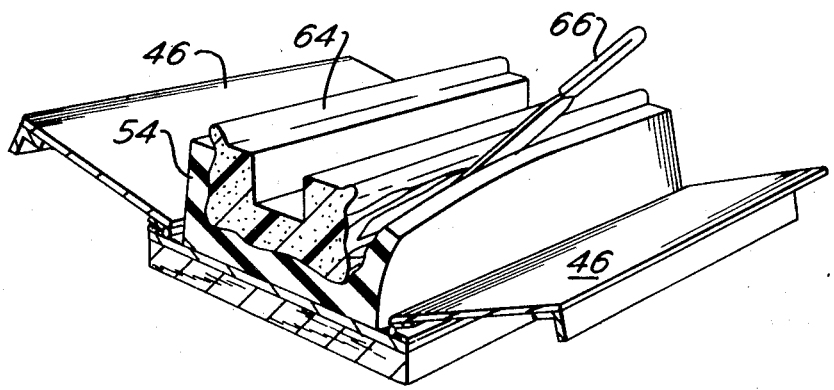

Feb. 8, 1972   P. H. FLECK   3,641,228
METHOD OF PRODUCING A MOLDED SIMULATED WOODEN ARTICLE
Filed Sept. 18, 1968   5 Sheets-Sheet 5
FIG.16
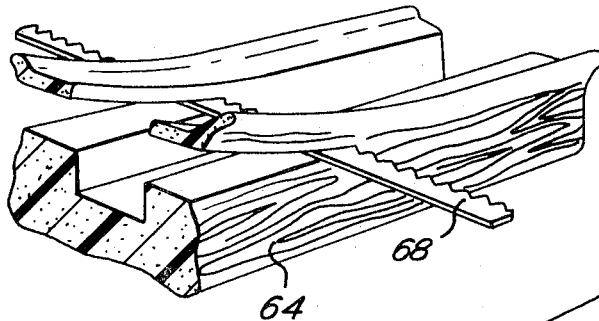
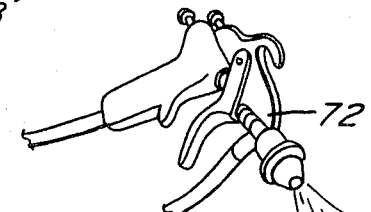
FIG.17
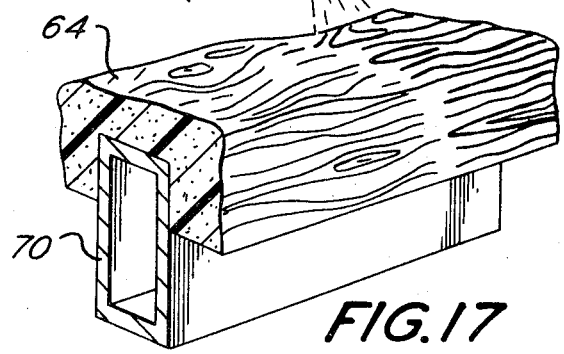
FIG.18
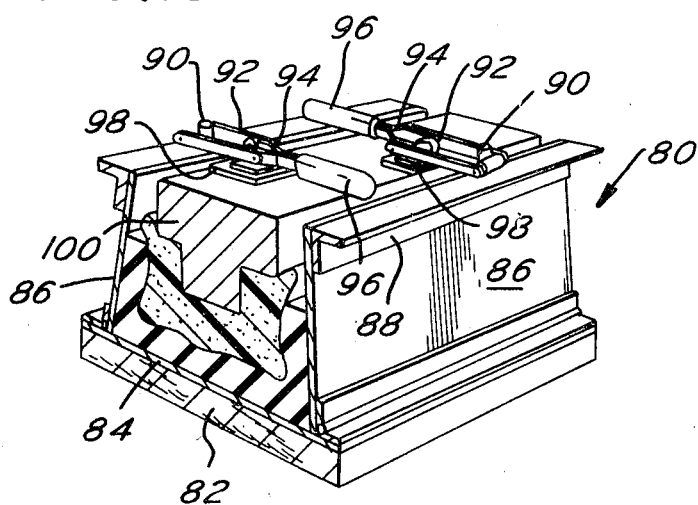
INVENTOR
PAUL H. FLECK
BY Jacob Trachtman
ATTORNEY

United States Patent Office 3,641,228
Patented Feb. 8, 1972

3,641,228
METHOD OF PRODUCING A MOLDED SIMULATED WOODEN ARTICLE
Paul H. Fleck, Melrose Park, Pa., assignor to Urethane Fabricators, Inc., Camden, N.J.
Filed Sept. 18, 1968, Ser. No. 760,414
Int. Cl. B29d 27/04
U.S. Cl. 264—53     1 Claim

ABSTRACT OF THE DISCLOSURE

A molded article formed of a synthetic polymeric material which identically simulates the appearance of a wooden master in every detail including graining, knot-holes, splits, and the like. This article is formed from polyurethane or a similar plastic material which can be cured under pressure in a mold, with or without the application of heat. The mold itself is formed as a reverse image of the master and is formed of silicone rubber or similar material which is adapted to be impressed with every textural feature of the master.

---

This invention relates to a molded article simulating a natural product such as, for example, a wooden beam or the like, and it also relates to the process of making such article.

Wooden beams, wall panels, and the like are becoming increasingly used as decorative features in the home, the office, the factory showroom and other such areas. However, one of the factors mitigating against their wider use is the high cost of wood, especially wood containing a distinctive texture consisting of certain desirable graining, knot-holes, distress marks, etc. Although synthetic products made of pressed-board or plastics have heretofore been used to simulate the appearance of wood, it has not, heretofore, been possible to provide the appearance of graining, knot-holes, distress marks, and the like, in a manner sufficiently similar to the actual wood to be a satisfactory substitute for such wood.

It is an object of the present invention to overcome the above difficulties by providing a molded article formed of synthetic plastic material which has, in every way, the appearance of grained, knot-holed or otherwise distinctively textured natural products such as wood.

Another object of the present invention is to provide a process for making an article of the aforesaid type which is simple, relatively inexpensive and which, because it requires relatively little skill and relatively uncomplicated apparatus, has a high degree of commercial feasibility.

Other objects and many of the attendant advantages of this invention will be readily appreciated as the same becomes better understood by reference to the following description when read in conjunction with the accompanying drawings wherein:

FIG. 1 is a fragmentary top perspective view of a molded, simulated wooden beam embodying the present invention.

FIG. 2 is a perspective view, partly broken away, of a room provided with a beamed structure embodying the present invention.

FIGS. 3 through 17 are either perspective or cross-sectional views showing the various steps in forming the article of FIG. 1.

FIG. 18 illustrates an alternative type of mold box.

The simulated article may be formed from any of a variety of thermosetting polymeric materials, especially of the foam type. Among such polymers are urethane foam, phenolic foam, urea formaldehyde, epoxy foam, polystyrene foam, polyether foam, etc., which are utilized either by themselves or to form a reaction product with fluorinated hydrocarbons. The preferred material is a polyurethane foam, as illustrated by the following example:

The preferred material for making the simulated article is a polyurethane foam. A preferred type of such polyurethane foam is prepared from a commercially available product called "Isonate System CPR 336" produced by the Upjohn Company, Torrence, Calif. It is a fluorocarbon-blown, rigid polyether urethane foam. The following example illustrates such composition:

EXAMPLE 1

Two polyurethane components, A and B (Isonate System CPR 336) are mixed together. Component A has a viscosity of 250 cps. and a specific gravity of 1.24 at 77° F. (ASTM method). Component B has a viscosity of 430 cps. and a specific gravity of 1.18 at 77° F. (ASTM method).

The two components are provided in ratios of 47% by weight of Component A and 53% by weight of Component B. Component A is deposited in the mix at 115° F. and Component B at 74° F., both at a pressure of 35 pounds.

The two components are mixed for 10 seconds at a mixing speed of 7,000 r.p.m.

The resulting mixture has a cure time of about 8 minutes at 145° F., at the end of which time a polyurethane foam is produced.

Referring now in greater detail to the various figures of the drawings, there is shown in FIG. 1 a portion of a molded beam generally designated 10, embodying the present invention.

The beam 10 is shown as being rectangular in shape and as having an undercut recess 12. It is also provided with graining 14 and knot-holes 16. It is, however, to be understood that any other wood texture and any other shape or size is equally within the scope of the invention.

FIG. 2 illustrates how a beam, such as beam 10 of FIG. 1, is utilized as a decorative feature in a room. The room is indicated generally at 18 and includes walls 20 and a ceiling 22. The beam 24 (similar to beam 10) is provided with a longitudinal plug 26 frictionally or otherwise retained in the groove 28 (similar to groove 12 in FIG. 1). This plug 26 is provided with nails 30, which may, optionally, be set in place prior to insertion of the plug 26 in the groove 28 so that the heads thereof bear against the rear surface of the plug. The nails 30 serve to hold the beam against the ceiling. Instead of nails, glue or any other securing means may be used as desired. Vertical beams 32, similar to beam 24, may also be provided, if desired. These may be secured in any desired manner both to the horizontal beam 24 and to the walls 20, as for example, by glue 34.

The process of making the beam 10 is illustrated in FIGS. 3 to 18 inclusive. FIG. 1 shows a wooden master 36 of the exact size, shape and texture desired in the final molded article. The master 36 is provided with an undercut recess 38 and a plurality of hanger bolts 40 which are screwed into the bottom edges of the walls bounding the recess 38.

The master 36 is set in place in a three-sided aluminum mold box 42 which includes a floor plate 44 mounted on a wooden base 45, hinged side panels 46, and a hinged end plate 48 releasably secured to the side plates by pins 49. The floor plate 44 is provided with drilled apertures 50 which are adapted to receive the bolts 40. Wing nuts 52 (shown in FIGS. 4 and 5) are positioned in recesses 53 in the base 45 and serve to hold the bolts 40 in position and securely clamp the master in place. The side plates 46 and end plate 48 are then moved into the closed or operative position shown in FIGS. 4 and 5. It is to be noted that, in the closed position, the side plates 46 are inwardly inclined. This is important because it permits the molded material to expand when heated when it, itself, serves as a mold for the final product.

After the mold is in position, as in FIG. 4, the mold-forming substance which, in this instance, is silicone rubber (General Electric grade RTV-60), is poured into the mold box. The silicone is worked into the surfaces with putty knives so that any air bubbles present will be broken up and no holes will, therefore, be present in the surfaces of the completed mold. The mold is then left to cure at room temperature for a period of from about 24 to 48 hours, after which it is placed in a heated oven for 2 hours at about 150° F. to complete the cure. The resultant mold 54 is an exact reverse duplicate of the master 36 not only in size and shape but also as regards every indentation, knot-hole and grain structure.

After the mold 54 has cooled, both it and the master 36, while still together, are removed from the mold box 42 (as shown in FIG. 6). The master 36 is then removed and the mold 54 is ready for use.

Although silicone rubber is preferred as the material for the mold 54, other substances can be used, such as, for example, latex rubber, etc. The silicone rubber is preferred, however, because it is easier to apply and is longer lasting, and also because it provides the most satisfactory grain structure.

In the next step (as shown in FIG. 7), the mold 54 is reversed, so that the cavity is uppermost, and it is then placed in the mold box 42. The side and end plates of the mold box are then closed (as in FIG. 8), and the internal surfaces of the mold 54 are sprayed with an appropriate release agent.

It is preferred to use a release agent since most polyurethane foams contain some amino acid which causes a reaction between the silicone and the polyurethane. This reaction results in an adhesive layer between the mold and the polyurethane which might damage the product when the mold is released. Furthermore, although there are some special silicone rubbers and also urethane foams that are not made with any amino acids, and which, therefore, do not require a release agent for this reason, eventually an adhesive reaction does set in. This adhesive reaction causes pulling up of the surface skin of the urethane, resulting in damage when the mold is released.

Various types of release agents may be used such as wax-like olefins or silica gel suspended in methylene chloride or acetone, or polyethylene, polypropylene, polyisobutylene, etc. suspended in suitable liquid vehicles. In all cases, if a liquid solvent or carrier is used for the release agent, it is preferred to have such liquid vaporize at the molding temperature so as to leave only the release agent. It has been found that a very suitable release agent is a 12% solution of wax-like olefins in methylene chloride.

The spraying of the release agent is shown in FIG. 9, any ordinary spray head, such as indicated at 56, being use. If desired, the release agent may be applied by other means such as brushing, dipping, etc., depending on the particular agent used and on the particular treating apparatus.

The liquid polyurethane foam is then deposited in the mold cavity by a spray head, or the like, 58, as shown in FIG. 10. It is to be noted that the spray head contains a plurality of nozzles extending in different radial directions so that the foam is evenly distributed on all surfaces of the mold, thereby preventing "fold-over" of foam caused by rise of the foam from the lower surface only.

Thereafter, as shown in FIG. 11, an aluminum insert 60 is applied, as indicated in FIG. 11, and is held in position by pins 62 (see FIG. 12) inserted through corresponding apertures in the end plate 48 of the mold box and in an end plate 63 (see FIG. 11) on the insert 60. The insert is used to form a center cavity in the final product.

The mold box and its contents are then placed in an oven (not shown) where it remains at the particular curing temperature and for the particular time required to cure the particular material. In this instance, the temperature is maintained at 145° F. for a period of about 10 minutes.

The inclined sides 46 also serve an important function in this step because they result in providing sharp details of all the features and texture of the mold on the molded article.

After the curing has been completed, the insert 60 is then removed (as shown in FIG. 13), and the mold box is opened (as in FIG. 14). The molded article 64 may be removed either mechanically or by hand, as, for example, by means of a wedge 66 or the like (as in FIG. 15), and the excess or waste is cut away by a knife or saw 68 (as in FIG. 16). The article is then placed on a moving support conveyor 70 (as in FIG. 17) and painted with the desired wood-colored paint, as by a spray gun 72 or by any other desired means, to simulate the original color of the master.

An alterntive type of mold box is illustrated in FIG. 18. This mold box, generally designated 80, is similar to the mold box 42 in having the same wooden base 82, floor plate 84, and hinged side plates 86. However, the top flanges 88 on each side plate are each provided with an upstanding lug 90 which pivotally supports a fork-type level 92. The level 92 is pivotally connected to a rod 94 having a handle 96 at one end and to the other end of which is pivotally connected a bearing plate 98.

The operation of the apparatus of FIG. 18 is obvious from the drawings. The bearing plates 98 apply pressure to the insert 100, and this pressure can be predetermined by the setting of the levers. This type of apparatus provides a more positive pressure than that illustrated in FIGS. 3 to 17.

Although not specifically illustrated as such in the drawings, this process is adapted to be conducted in a continuous manner on a conveyor system whereby there are a series of mold boxes on a conveyor belt, and a series of stations, one station for each operation indicated in FIGS. 3 to 17 (or alternatively including the operation of clamping and unclamping the pressure plates if the mold box of FIG. 18 is used). This type of process would provide for timed, intermittent steps or pauses to permit each operation to take place. This would include the necessary pause for permitting curing to take place in the oven.

Obviously, many modifications of the present invention are possible in the light of the above teachings. It is, therefore, to be understood that within the scope of the appended claim, the invention may be practiced otherwise than as specifically described.

What is claimed is:

1. A method of producing an article having the simulated appearance of wood, including surface graining, pores and other markings, which consists of placing a wooden master in a mold-box, pouring room-temperature vulcanizing silicone rubber into said mold box to fill all the surface graining, pores and other markings of said master and all the cavities and interstices between said master and the inner surfaces of said mold box, solidifying said silicone rubber within the mold box by substantially curing said silicone rubber at room temperature to produce an elastomeric mold having an inner surface contour which is the reverse image of the surface contour of the master and which posesses the reverse image of said surface graining, pores and other markings, removing the mold from the mold-box, then replacing it in the mold-box in reverse position, coating the inner surface of the elastomeric mold with a release agent, thereafter filling the cavity of the mold, while in the mold box, with liquid polyurethane foam, said foam being a fluorocarbon-blown, rigid polyether urethane foam prepared by admixing two polyurethane components, one having a viscosity of 250 cps. and a specific gravity of 1.24 (ASTM)

at 77° F. and other a viscosity of 430 cps. and a specific gravity of 1.18 (ASTM) as 77° F., the first component being present in lesser amount than the second component, applying an insert to the polyurethane foam to form a cavity in the final product, said insert being held in position by the pressure exerted by at least one bearing plate connected to a lever assembly pivotally mounted on said mold-box, solidifying the foam to form a simulated wooden article, and then removing the article from the mold.

References Cited

UNITED STATES PATENTS

| | | | |
|---|---|---|---|
| 2,316,143 | 4/1943 | Peebles et al. | 264—226 |
| 2,855,021 | 10/1958 | Hoppe | 260—2.5 |
| 2,931,063 | 4/1960 | Harris | 264—47 |
| 3,110,938 | 11/1963 | Beck et al. | 161—159 |
| 3,222,443 | 12/1965 | Dames et al. | 264—337 |

OTHER REFERENCES

Ferrigno, "Rigid Plastics Foams," Reinhold 1963 pp. 10, 11, 72, 73, 74, 75, 131, 132.

DONALD J. ARNOLD, Primary Examiner

A. H. KOECKERT, Assistant Examiner

U.S. Cl. X.R.

264—225